UNITED STATES PATENT OFFICE.

HUGH E. PLUNKETT, OF MALDEN, MASSACHUSETTS, ASSIGNOR, BY MESNE ASSIGNMENTS, TO UNITED STATES TROPICAL FOOD COMPANY, OF MALDEN, MASSACHUSETTS, A CORPORATION OF MASSACHUSETTS.

FOOD FROM BANANA AND MILK AND METHOD OF PREPARING SAME.

1,165,802.     Specification of Letters Patent.     Patented Dec. 28, 1915.

No Drawing.     Application filed November 23, 1914. Serial No. 873,457.

*To all whom it may concern:*

Be it known that I, HUGH E. PLUNKETT, of Malden, in the county of Middlesex and State of Massachusetts, have invented a certain new and useful Composition of Matter for Food from Banana and Milk and Method of Preparing the Same, of which the following is a specification.

This invention relates to a new and useful composition of matter for food from banana and milk and method of preparing the same between the stages of ripe and well fit bananas before and after ripening.

In carrying out my method to produce the new composition of matter, the skins are removed preparatory to the sorting of the banana meats, as follows: First: the meats of well fit bananas before turning to ripe. Second: the meats just on the turning to ripe. Third: the meats fourteen hours later than the second sorting. Fourth: the meats fourteen hours later than the third sorting. These banana meats after sorting are all mixed and blended together in a suitable pulping machine to grind them up to remove the stain and moisture which is difficult to do from the whole meats. The pulps of the banana meats are then placed in a suitable whipping machine or beater and whipped into a smooth light paste to mix the meats thoroughly in order to blend the ripe meats with the well fit meats. This paste is then measured into suitable or equal parts and placed in trays and spread out evenly. These trays are then placed in a suitable vacuum drying machine, heated by steam or other means best suited for the purpose, where the moisture and staining liquids are evaporated at the same time from the banana paste. The product is then removed from the vacuum drier in a perfectly dry condition and is then passed through a pulverizing machine to reduce the dried pulp into powder, and then put through a suitable sifting apparatus. After the sifting is completed, one-third of this banana powder is combined with two-thirds of pure evaporated solids of milk to which mixture is added a finely granulated sugar, one ounce to the pound, and the mixture is then placed into a dry mixer or blending apparatus in order to make the powder soluble so that it will dissolve easily and mix with milk and hot water. This product will keep indefinitely without change, and as a food contains considerable nutrition, as proved by its actual use by numerous physicians where it proved a pure and active nourishment, and in every case where it has been tested it has been found free from all fraudulent and injurious adulterations.

The analysis by Professor Allyn of Westfield Laboratories is as follows:

| | |
|---|---|
| Acidity. As acetic | 1.41% |
| Ash | 6.03% |
| Total solids | 94.10% |
| Moisture | 5.90% |
| Fat or ether extract | 5.28% |
| Cold water extract | 96.50% |
| Carbohydrates (starches and sugars) | 60.60% |
| Protein | 22.19% |
| Calories per pound (Rubner) | 1762 |
| Preservatives | None |
| Adulteration { Fraudulent | None |
|               { Injurious | None |
| Quality | Good |

Having thus described my invention, what I claim as new and desire to secure by Letters Patent of the United States, is:

1. The herein described method which consists, first, in removing the skins and sorting the banana meats as set forth, second, in placing the banana meats in a pulping machine for grinding the same, third, in placing the pulped banana meats in a whipping machine or beater to whip the same into a smooth paste to mix and blend the banana meats, and lastly, in drying the banana paste to evaporate the moisture and staining liquids therefrom.

2. The herein described method which consists, first, in removing the skins and sorting the banana meats as set forth, second, in placing the banana meats in a pulping machine for grinding the same, third, in placing the pulped banana meats in a whipping machine or beater to whip the same into a smooth paste to mix and blend the banana meats, fourth, in drying the banana paste to evaporate the moisture and staining liquids therefrom, and lastly, in placing the dried material in a pulverizing machine to powder the same.

3. The herein described method which consists, first, in removing the skins and sorting the banana meats as set forth, second, in placing the banana meats in a pulping machine for grinding the same, third, in placing the pulped banana meats in a whipping machine or beater to whip the same into a smooth paste to mix and blend the banana meats, fourth, in drying the banana paste to evaporate the moisture and staining liquids therefrom, fifth, in placing the dried material in a pulverizing machine to powder the same, and lastly, in sifting the powdered banana material.

4. The herein described method which consists, first, in removing the skins and sorting the banana meats as set forth, second, in placing the banana meats in a pulping machine for grinding the same, third, in placing the pulped banana meats in a whipping machine or beater to whip the same into a smooth paste to mix and blend the banana meats, fourth, in drying the banana paste to evaporate the moisture and staining liquids therefrom, fifth, in placing the dried material in a pulverizing machine to powder the same, sixth, in sifting the powdered banana material, seventh, in mixing with the sifted material evaporated solids of milk and sugar in substantially the proportions described, and lastly in placing the mixed material in a blending apparatus to make the powder soluble so as to mix with the milk.

5. A composition of matter for food from banana and milk, which consists of powdered banana meats, evaporated solids of milk and sugar.

6. A composition of matter for food from banana and milk, which consists of powdered banana meats, evaporated solids of milk and sugar in the proportions as substantially set forth.

In testimony whereof, I have signed my name to this specification in the presence of two subscribing witnesses, this thirtieth day of October A. D. 1914.

HUGH E. PLUNKETT.

Witnesses:
MARY RYAN,
LOUIS G. JODOIN.